Patented Mar. 11, 1947

2,417,327

UNITED STATES PATENT OFFICE 2,417,327

ROSIN-MALEIC ANHYDRIDE-NON-CONJUGATED FATTY OIL VARNISHES

Lawrence K. Scott, Louisville, Ky., assignor to Devoe & Raynolds Company, Inc., a corporation of New York No Drawing. Application September 27, 1945, Serial No. 618,994

8 Claims. (Cl. 260—22)

It has been known for many years that maleic anhydride will react with rosin to form rosin maleate, and this product (usually esterified with glycerine) is used in large quantities in the manufacture of varnishes. I have discovered that it is possible to cause maleic anhydride to react directly and simultaneously with both rosin and with drying or semi-drying oils having non-conjugated ethylene linkages. In such case, the maleic anhydride appears to serve as a bridging member between the rosin and the oil so that complex molecules are formed in which the nuclei of all three ingredients are combined. After this combination has taken place, ordinarily the acid number of the product will be reduced by esterifying free acid valances with glycerine or some other polyhydric alcohol.

The known reaction between rosin and maleic anhydride takes place quite easily at temperatures ranging between 130° and 180° C. and even if a drying oil is present at these temperatures the reaction between the rosin and the maleic anhydride goes on without the oil being affected. This is true even at temperatures ranging up to approximately 200° C., but if a mixture of oil, anhydride and rosin in proper proportions is brought with reasonable rapidity to temperatures ranging substantially above 200° C., the reaction to which this invention relates appears to take place, with the oil being actually brought into the combination.

In order to carry out this reaction on a commercially valuable basis, it is necessary not only to have the proper temperature but also to maintain the percentage of maleic sufficiently low. On this score the most important requirement is that the maleic anhydride should be present in less than molecular proportions relative to the rosin. The proportion of maleic to the oil is not so critical. A drying oil consists of three chains, each averaging about 2 double bonds, connected to a glycerol base. From this it follows that the ordinary drying oil has about six points at which the maleic might react. In general, I have found that even though theoretically six mols of maleic might react with each mol of drying oil, nevertheless, the oil should be present in large excess over these stoichiometric proportions and the amount of maleic anhydride should not substantially exceed equal molecular proportions relative to the oil, and preferably the maleic anhydride should be present in less than equal molecular proportions relative to the oil. At the low end as little as ⅓ mol of maleic for each mol of oil will give valuable results. If these relationships between the maleic anhydride and the other two ingredients are followed, a large variation in relationship between the oil and the rosin is possible and this can be varied according to the desire of the varnish maker.

As regards the temperature to be employed, some results may take place shortly above 200° C. but in order to get commercially valuable results, the temperature must be substantially higher than this unless the time is to be drawn out very long. Thus if a temperature of 210° C. is employed, one cannot rely upon the reaction being completed in less than several hours, whereas, at temperatures in the order of 220° C., the time employed may be in the order of about 1½ hours. The top limit of temperature is governed by the factor of gelation and tendency of the oil to discolor; as a guide I can state that the temperature should ordinarily not exceed 320° C. A good commercial range of operation is between 225° C. and 285° C. within which range the reaction ordinarily can be carried out in about an hour and one-quarter at the lower end of the range and in as little as 15 minutes towards the upper end of the range.

In carrying out the reaction, all three ingredients (that is the oil, resin and maleic anhydride) should be mixed together before heating, though it is also permissible first to heat the resin and oil together and then add the maleic anhydride. The important thing is that the maleic anhydride be caused to react with the rosin and oil simultaneously.

After the primary reaction is completed, it is ordinarily preferable to neutralize the free acid groups, and glycerine is the preferred material used for such neutralization, though other alcoholic or basic bodies may be employed. This step is carried out by making a determination of the acid number and then esterifying with the proper amount of basic material as is well understood in the art.

This reaction is distinctly different from the reaction of making alkyd resins containing glycerine, rosin and maleic anhydride, and substantial amounts of free glycerine should not be present while the reaction is taking place. On the other hand, the rosin may be esterified with glycerine before it is introduced into the mass to form rosin esters such as ester gum. Such esterification does not affect the double bonds of the rosin and therefore does not interfere with the reaction between the rosin and the maleic anhydride. Accordingly for the purpose of this application, such an ester gum is to be considered as the full equivalent of natural rosin.

In considering the mechanics involved in the reaction of my invention, it must be borne in mind that when the maleic molecule bridges between an oil molecule and a rosin molecule, it opens each of these molecules at a double bond leaving residual unsatisfied valences. These valences may connect directly together making an additional bond between the rosin and oil or they may result in forming complex molecules having varied proportions of rosin, maleic and linseed oil nuclei but in any event these three types of body will be united into single molecules of considerable stability having great value for paint and varnish purposes. In part this value will be found in the fact that the resulting molecule will contain a number of residual double bonds since when the oil employed is a drying oil such molecule will contain at least one double bond from the combining oil chain as well as one from the rosin, both of which will be available for the mechanics of drying. In other words, a molecule including one oil nucleus and one rosin nucleus will have as many double bonds as the oil molecule had initially.

If desired, the oil ingredient may be heat-bodied before being reacted with the maleic anhydride to give varnishes of somewhat increased viscosity.

When my reaction is carried out as above described and as shown in the accompanying examples, I am able to obtain from the usual fatty oils having non-conjugated ethylene linkages plus rosin and a small percentage of maleic anhydride, varnishes which actually possess many distinct advantages over the varnishes made from China-wood oil and the maleic type resins such as resins made by reacting rosin, maleic anhydride and glycerol. For example, if the varnishes made by my process from linseed, perilla, fish and soybean oils, rosin or ester gum, are compared with varnishes of the same length made from China-wood oil and a maleic type resin, my varnishes actually show tougher films when baked, better pigment wetting properties and good adhesion. In addition, these varnishes are very easy to manufacture and are relatively inexpensive.

The following examples will serve to illustrate the process of my invention:

Example I

| | Parts |
|---|---|
| Rosin—W. G. | 255 |
| Maleic anhydride | 27 |
| Perilla oil | 467 |
| Glycerol | 39 |
| Lead carbonate | 15 |
| Mineral spirits | To thin |

The rosin, oil and anhydride are heated to 260° C. and held 10 minutes, when the glycerol is added and the temperature of 260° is regained and held for one hour. The lead carbonate is added and the temperature is raised to 300° C. and held for two hours. The varnish is allowed to cool and thinned to the desired viscosity. Liquid metallic driers are added in amounts to obtain the desired drying. For example, I may use cobalt and manganese naphthenates equivalent to 0.02% Co. and 0.02% Mn. based on non-volatile ingredients may be employed.

Example II

| | Parts |
|---|---|
| Rosin—W. G. | 255 |
| Maleic anhydride | 27 |
| Perilla oil | 467 |
| Glycerol | 43 |
| Lead carbonate | 15 |
| Mineral spirits | To thin |

The perilla oil is heated to 310° C. for 3 hours for a slight string at which time rosin is added. When a temperature of 235° C. is reached, maleic anhydride is added and 235° C. regained and held 15 minutes, when the glycerol is added and 275° C. gained and maintained for 30 minutes, then 300° C. is gained and maintained 30 minutes. The varnish is cooled for 30 minutes and the lead carbonate is added, when it is further cooled and thinned with mineral spirits to the desired body. Liquid driers are then added as above.

Example III

| | Parts |
|---|---|
| Rosin—W. G. | 170 |
| Maleic anhydride | 18 |
| Linseed oil | 310 |
| Glycerol | 28 |
| Mineral spirits | To thin |

The linseed oil, maleic anhydride and rosin are heated together to 260° C. and held 15 minutes. The glycerol is added and 260° C. regained and maintained one hour, when 290° C. is gained and held three hours. The varnish is cooled and thinned to the desired viscosity. Liquid driers are then added as above.

Example IV

| | Parts |
|---|---|
| Ester gum | 85 |
| Maleic anhydride | 18 |
| Perilla oil | 186 |
| Glycerol | 11.25 |
| Mineral spirits | To thin |

The ester gum, maleic anhydride, and perilla oil are heated to 260° C. and held 20 minutes. The glycerol is added and 260° C. regained and held one hour when 295° C. is gained and held 45 minutes. The varnish is cooled and thinned to the desired viscosity. Liquid driers are then added as above.

Example V

| | Parts |
|---|---|
| Rosin—W. G. | 85.0 |
| Maleic anhydride | 19.4 |
| Soya bean oil | 195.0 |
| Glycerol | 19.5 |
| Mineral spirits | To thin |

The soya bean oil, maleic anhydride and the rosin are heated together to 260° C. and held 20 minutes. The glycerol is added and 260° C. regained and held one hour. 300° C. is then gained and held 4 hours. The varnish is cooled and thinned to the desired viscosity. Liquid driers are then added as above.

Example VI

| | Parts |
|---|---|
| Ester gum | 85.0 |
| Maleic anhydride | 19.4 |
| Soya bean oil | 195.0 |
| Glycerol | 12.2 |
| Mineral spirits | To thin |

The soya bean oil, maleic anhydride and ester gum are heated together to 260° C. and held 20 minutes. The glycerol is added and 260° C. regained and held one hour. 300° C. is then gained and held 3 hours. The varnish is cooled and thinned to the desired viscosity. Liquid driers are then added.

Example VII

| | Parts |
|---|---|
| Rosin—W. G. | 255 |
| Maleic anhydride | 27 |
| Perilla oil | 468 |
| Glycerol | 48 |
| Heat reactive 100% phenolic resin | 15 |
| Lead carbonate | 20 |
| Mineral spirits | To thin |

The perilla oil is heated to 310° C. for 3 hours for a slight string at which time the rosin is added. After the rosin has dissolved, the phenolic resin is added. When the temperature has fallen below 250° C. the maleic anhydride is added and 232° C. is held for 1 hour. The glycerol is added and the temperature raised to 280° C. and held one hour. The lead carbonate is added and the varnish cooled and thinned with the mineral spirits to the desired viscosity. Liquid driers are then added.

It will be noted in the foregoing examples that in each case no glycerol or other polyhydric alcohol was present when the maleic anhydride was reacted with the rosin and oil, thus clearly distinguishing this process from the process of making alkyd resins where the dicarboxylic acid is combined with polyhydric alcohol. It is also to be noted that in these examples the proportion of maleic anhydride relative to the oil varies between about ½ mol of maleic anhydride per mol of oil at the lower end of the range, and about 1 mol of maleic anhydride per mol of oil at the higher end.

Phenolic resins of various types may be used and the amount may be varied depending on the purpose the varnish is to fulfill. In some cases, modified phenolics (let down say with ester gum) are used; in others 100% phenolics as is well known in the art. In some cases, the so-called reactive phenolics are used; in others, non-reactive phenolics are used.

While the above examples are cited to illustrate the purpose of the invention, I do not wish to be bound to the proportions given and therein indicated since other oils and oil lengths can also be used and other modifications made.

This application is a continuation in part of my earlier application Ser. No. 426,885, filed January 15, 1942, which in turn was a continuation in part of my earlier application, Ser. No. 295,013, filed September 15, 1939.

What I claim is:

1. In the process of making varnishes, the step which comprises simultaneously reacting together rosin, maleic anhydride and a fatty oil having non-conjugated ethylene linkages selected from the group consisting of the drying oils and semi-drying oils, at a temperature above 200° C. and not exceeding 320° C., the maleic anhydride being present in less than equal molecular proportions relative to the rosin and in proportion of from about ⅓-mol to 1 mol of maleic anhydride for each mol of oil, the reaction being carried out in the absence of polyhydric alcohol.

2. A process as specified in claim 1 which includes the further step of esterifying the resulting rosin-maleic-anhydride-oil product with glycerine.

3. A process as specified in claim 1, in which the temperature employed is between 220° C. and 285° C.

4. A process as specified in claim 1, in which the maleic anhydride is present in less than equal molecular proportions relative to the oil.

5. In the process of making varnishes, the step which comprises simultaneously reacting a substance selected from the group consisting of rosin and the polyhydric alcohol esters of rosin, with maleic anhydride and a fatty oil having non-conjugated ethylene linkages selected from the group consisting of the drying oils and semi-drying oils, at a temperature above 200° C. and not exceeding 320° C., the maleic anhydride being present in less than equal molecular proportions relative to the rosin and in proportion of from about ⅓-mol to 1 mol of maleic anhydride for each mol of oil, the reaction being carried out in the absence of polyhydric alcohol.

6. A process as specified in claim 5, in which the rosin is initially introduced as ester gum.

7. An intermediate varnish ingredient consisting of the reaction product of rosin, maleic anhydride and a fatty oil having non-conjugated ethylene linkages selected from the group consisting of the drying oils and semi-drying oils reacted together simultaneously at a temperature above 200° C. in proportion of less than one mol of maleic anhydride for each mol of rosin and in proportion of between ⅓-mol and 1 mol of maleic anhydride for each mol of oil, the maleic anhydride nucleus in such reaction product serving as a bridge to bond together the rosin and the oil to form a molecule still having on the average as many double bonds as the oil employed, the reaction being carried out in the absence of polyhydric alcohol.

8. A product as specified in claim 7 which is esterified with glycerine.

LAWRENCE K. SCOTT.